C. B. KIRKHAM.
CRANK CASE MAIN BEARING.
APPLICATION FILED FEB. 7, 1916.
1,283,803.
Patented Nov. 5, 1918.
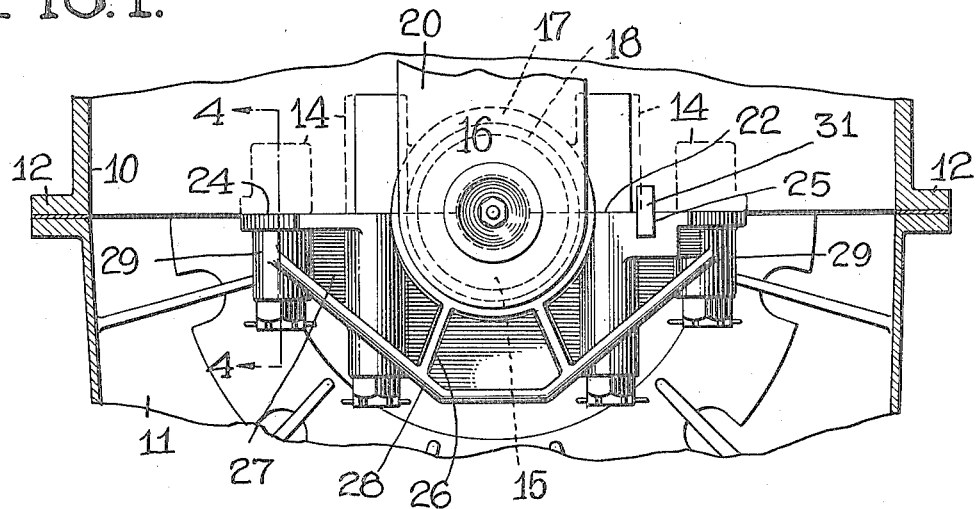
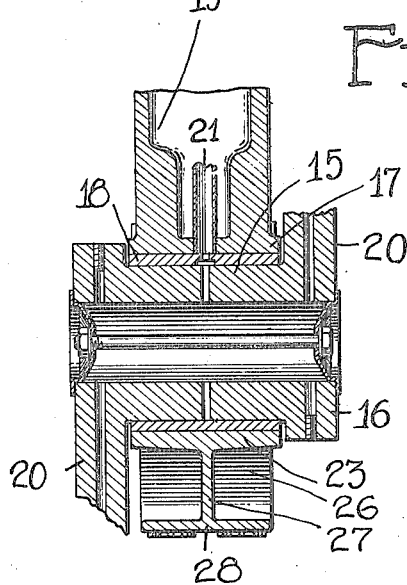
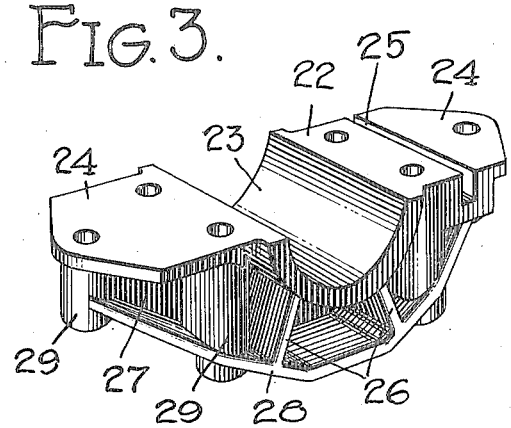
INVENTOR
CHARLES B. KIRKHAM.
BY
*John P. Harbay*
ATTORNEY

UNITED STATES PATENT OFFICE.

CHARLES B. KIRKHAM, OF BUFFALO, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

CRANK-CASE MAIN BEARING.

1,283,803.  Specification of Letters Patent.  Patented Nov. 5, 1918.

Application filed February 7, 1916. Serial No. 76,712.

*To all whom it may concern:*

Be it known that I, CHARLES B. KIRKHAM, a citizen of the United States, residing at Buffalo, in the county of Erie and State of New York, have invented certain new and useful Improvements in Crank-Case Main Bearings, of which the following is a specification.

The present invention relates to a motor accessory and is particularly concerned in the provision of a crank shaft bearing cap which is especially designed to secure great strength with comparative lightness, in order to render its use advantageous in power plants adapted for such high speed service as is expected of an aeronautical motor.

Usually the crank casing is ribbed from wall to wall transversely and bearing portions are provided in the various ribbings and in longitudinal alinement for the reception of the crank bends of the motor's driving shaft, while caps formed with mating bearing portions are secured to the ribbings after the crank shaft has been placed in position. It is to such bearing caps my present invention relates.

As a principal object I contemplate the provision of a bearing cap having a semi-cylindrical bearing portion which is ribbed both transversely and longitudinally by webs flanged out into substantial I-sections. The lower flanging of these webs is arranged to form a suspended truss and continues laterally to reinforce wing portions which are formed transversely upon the central bearing portion. A key seat is provided in one of these wings for the reception of a key or feather which is adapted to be directly interposed between the bearing cap and the crank case ribbing to which the cap is secured, bolts or similar suitable fastening means being employed for the latter purpose.

It is well known that the I-section is one of the strongest of all metal sections in comparison to its weight, and it is for this reason that I have selected this form in particular for the reinforcement of the cap bearing. By radiating certain of the ribs from the central bearing portion and by constructing other adjoining flanges after the manner of a simple truss I have succeeded in evolving a reinforcement for the cap which is remarkably strong in comparison to its weight. The details of the construction and arrangement which I have thus broadly set forth have been illustrated in the accompanying drawings, will be described in the following specification and then more clearly pointed out in the claims which are appended hereto and form a part of this application.

With reference to the drawings, in which there is illustrated one embodiment of the invention, and throughout the several views of which like characters of reference designate similar parts, Figure 1 is a transverse, sectional view taken through the crank casing of a motor which is equipped with the bearing cap comprehended by this invention;

Fig. 2 is a longitudinal section taken through one of the crank shaft bends as mounted in the bearing completed by addition of the cap;

Fig. 3 is a view in perspective of the cap *per se*, and

Fig. 4 is a detail sectional view taken on the line 4—4 of Fig. 1.

The crank casing, as a whole, of any internal combustion motor is usually built up from upper and lower portions which are designated in Fig. 1 by respective numerals 10 and 11. These portions are laterally flanged as indicated at 12 for securement to each other. The upper portion 10 of the crank case is provided with transverse ribbing 13, which in the present instance has been illustrated as being double walled and as extending downwardly flush with the flanging 12. Between the double walls of the ribbing 13 are formed the integral blocks 14 of varying height and adapted, as will be later shown, to receive the fastening bolts 30 which secure the bearing cap to the under edge of the ribs 13.

It will be understood that the spacing of the ribs 13 longitudinally of the upper portion of the crank case is to be determined by the spacing between crank bends 15 of the power shaft denoted as a whole by the numeral 16. Each of these ribs is accordingly formed with an arcuate bearing portion 17 which is lined with a suitable anti-friction metal 18 adapted to have direct contact with the appropriate crank 15. The walls of each rib 13 are thickened out in the manner denoted by the numeral 19 of Fig. 2 immediately over the central bearing portion, while both the crank 15 and the crank arms 20 attached thereto are bored longitudinally to provide lubricating passages, which may be fed through conduits 21 extending vertically between the double walls of the rib 13.

The bearing portion 17 of each crank case rib is, of course, but semicylindrical, which accordingly necessitates the employment of the complementary bearing portion which is provided by the cap 22.

By referring to Fig. 3 in particular, the construction of the cap 22 will be apparent. The bearing portion 23 thereof has the same dimensions as that of the rib bearing 17 and is fitted with the sleeve 18 of anti-friction metal previously mentioned. Extending laterally from the bearing portion 23 are opposite wing portions 24, one of which is provided with a key seat 25 paralleling the axis of the bearing. Radiating from the under surface of the bearing portion 23 are a number of webs 26 which form a longitudinal reinforcement of the cap which is completed by the transverse annular webbing 27 intersecting therewith. A truss flanging denoted as a whole by the numeral 28 is cast integrally with the webs 26 and 27, being in the form of an inverted arch whose extremities merge into the lateral wing portions 24. Each of the webs 26 accordingly becomes an I-section, whose opposite flanges are provided for by the truss flanging 28 at one extremity and by the bearing portion 23 at the other. It will be immediately apparent from an inspection of Fig. 2 that the transverse webbing 27 also partakes of a true I-section form.

Connecting each wing 24 with the flange 28 suspended therefrom are a plurality of lugs 29 which are bored for the reception of bolts 30, the latter entering into the seats provided therefor by the block portions 14 arranged between the double walls of the rib 13 to which the bearing cap is to be attached. A key or feather 31 is inserted within its seat 25 in the bearing cap, and in a similar seat arranged within the rib 13, being symmetrically interposed between two portions which make up the complete crank shaft bearing. This key receives such thrust as might be imposed upon the bearing cap out of alinement with the crank shaft 16.

From the foregoing it should be apparent that the objects previously presented have been attained by means of the construction covered in the description just concluded. It will be also clear that changes necessary to adapt my bearing cap to motors having slightly different characteristics in such manner as may be predicated upon the true spirit of the invention, which may be said to include those essential characteristics which are particularly pointed out in the appended claims may be made.

What is claimed is:

1. A crankshaft bearing cap of the type set forth including a bearing portion, and intersecting ribbing strengthening the bearing portion and forming I-sections therewith.

2. A crankshaft bearing cap of the type set forth including a bearing portion and ribs strengthening the bearing portion and forming longitudinal and transverse I-sections therewith.

3. A crankshaft bearing cap of the type set forth including a bearing portion and ribs strengthening the bearing portion and radiating therefrom to form I-sections therewith.

4. A crank shaft bearing cap of the type set forth including a bearing portion, I-section ribbing strengthening the bearing portion in one direction and ribbing radiating from the bearing portion to intersect the first said ribbing.

5. A crankshaft bearing cap of the type set forth including a bearing portion, I-section ribbing depending from the bearing portion and truss flanges connecting portions of the ribbing.

6. A crankshaft bearing cap of the type set forth, including a bearing portion, intersecting ribbing depending from the bearing portions and truss flanging formed integrally with said ribbing.

7. A crankshaft bearing cap of the type set forth including a bearing portion, truss flanging dependent from said bearing portion and lugs connecting the flanging with the bearing portion.

8. A crankshaft bearing cap of the type set forth including a bearing portion, truss flanging dependent from the bearing portion and webs radiating from the bearing portion to opposite portions of the truss.

9. A crankshaft bearing cap of the type set forth including a bearing portion, bolt lugs dependent from the bearing portion and I-section ribbing reinforcing said bearing portion and having corresponding flanges connected in truss shape and associated with said bolt lugs.

In testimony whereof I affix my signature.

CHARLES B. KIRKHAM.